Patented Jan. 28, 1941

2,229,744

UNITED STATES PATENT OFFICE 2,229,744

DIAZOAMINO COMPOUNDS AND METHOD OF MAKING

Jean G. Kern, East Aurora, N. Y., assignor to National Aniline & Chemical Company, Inc., New York, N. Y., a corporation of New York No Drawing. Application May 14, 1938, Serial No. 207,942

4 Claims. (Cl. 260—140)

This invention relates to a new type of diazoamino compounds and to compositions of matter containing them. The diazoamino compounds of the present invention are especially suitable for use in the art of dyeing textile fibers of any origin, for instance in the dyeing or printing of cellulose, either natural fibers or regenerated cellulose, cellulose esters or ethers, silk, wool, or hair fibers or fabrics. The diazoamino compounds of the present invention are useful as germicides, bactericides, and insecticides.

The diazoamino compounds of the present invention may be represented by the general formula:

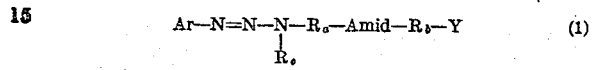  (1)

wherein

Ar represents an aromatic radical which may be further substituted but which is free from groups conferring solubility in water or alkalis and not separated from the aromatic nucleus by an —N=N—N— linkage; that is, the diazoamino compound should be free of sulfonate and carboxylate groups in particular or water solubility conferring groups in general on that part of the diazo nucleus which is severed from the stabilizing amine by acid hydrolysis.

Amid represents —SO$_2$NR— or —CONR—, wherein R represents hydrogen or an organic radical;

R$_a$ represents an aliphatic radical;

R$_b$ represents an aliphatic, alicyclic or aromatic radical;

R$_c$ represents hydrogen or an organic radical; and

Y represents at least one solubilizing group conferring solubility in water or aqueous alkaline solutions.

In the above formula it should be noted that one, two, or more amino-diazo-groups,

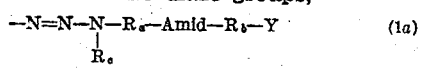  (1a)

may be joined to Ar; that is, the compounds may include not only diazo nuclei but tetrazo (bis-diazo) nuclei, etc. Ar may represent a group such as phenyl, naphthyl, diphenyl, anthranyl, anthraquinoyl, or carbazole, which may contain as substituents halogen (e. g. chlorine, bromine, or fluorine), nitro, alkyl, aryl, aralkyl, alkylaryl, alkoxy, aryloxy, azo, amino (primary, secondary, or tertiary), amido, and hydroxy groups, as well as additional amino-diazo groups as indicated above.

R$_a$ may be an aliphatic radical, wherein the carbons linked to the aminic —N— and to the Amid may be separated from one another by —O—, —CONH—, —COO—, —S—, —SO—, —CO—, —SO$_2$—, or —SO$_2$—NH— in any fashion. R$_a$ may be saturated or unsaturated and may contain substituents which do not interrupt the aminic —N— to Amid linkage, especially electro-negative substituents, e. g. halogen, or nitro, nitrile, phenolic, or sulfonic acid ester groups; or —CONH—, —CON=, —SO$_2$N=, or —SO$_2$NH— groups attached thereon in any fashion, or radicals conferring solubility in water or alkaline solution, e. g. sulfite, sulfato, phosphato, sulfonate, alcoholic, or carboxylate groups; or additional radicals of the type

  (2)

In the amid group of Formula 1 R has been indicated to represent hydrogen or an organic radical. R may represent an aliphatic, aromatic, cyclo-aliphatic, mixed aliphatic-aromatic, or acyl, e. g. a sulfonyl or carboxyl group such as represented by

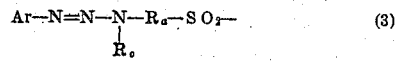  (3)

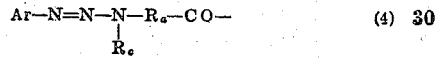  (4)

  (5)

or

  (6)

or a solubilizing group —R$_b$—Y (7), or a group of the type

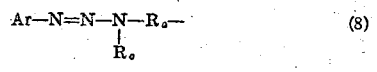  (8)

Thus "Amid" represents an ammonia (NH$_3$) molecule having one of its hydrogens substituted by an "acyl group" and another by an "organic carbon" other than acyl; the third hydrogen may be unsubstituted or may be substituted by either an "acyl group" or an "organic carbon" other than acyl. The acyl group of "Amid" may be on either side of the amidic nitrogen; joined either to R$_a$ or R$_b$; I have found the compounds of either arrangement to be equally effective for the purposes of this invention.

R$_b$ is a hydrogen- and carbon-containing group linked to "Amid" and to "Y", respectively, through a carbon atom thereof, which may be similar to R_a or may contain other substituents such as —Amid—R_b—Y or

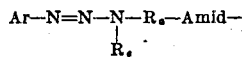

as well as those specified above for R_a. R_b may also be condensed with R to form a heterocyclic ring wherein nitrogen is a member thereof. In particular R_b may contain solubilizing groups in addition to Y and either similar to or different from Y.

Y may be one or more groups conventionally considered solubilizing groups and which, as is well known, contribute to the solubility, in water or aqueous alkaline solutions, of compounds to which they are attached. Such groups are alcoholic —OH groups, —COOH, $SO_3H$, —$OPO_3H_2$, —$OSO_2H$, —$OSO_3H$, and the corresponding groups wherein the H is replaced by sodium or potassium or a pentavalent nitrogen radical.

R_c may be a radical of the type —R_a—Amid—R_b—Y, or it may contain additional substituents of the type

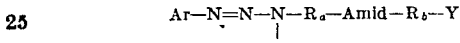

or it may be a radical such as R_a or R_b; R_c may be linked to R or to R_a, they may join to form a heterocyclic ring which contains either one or both nitrogen atoms as constituents of the nucleus, particularly of the azole or of the azine type, thus R and R_c together may constitute a polymethylene chain joining the N of the amine group with the N of the amid group.

In the preferred compounds R_a is an aliphatic radical which may be further substituted but which does not contain a chain of more than two aliphatic carbon atoms separating the aminic nitrogen from the amid group. I have found that compounds wherein the amid group is attached to the same carbon as, or to an adjacent carbon to, that joined to the diazoamino group, are more readily and more completely hydrolyzed to liberate the free diazonium salt than are compounds containing the amidic group in a position more remote from the diazoamino group.

The resistance of the more stable diazoamino compounds to hydrolysis may be reduced by the introduction of electro-negative substituents attached to the carbon joined to the diazoamino nitrogen or attached to a carbon adjacent to this carbon. Electro-negative groups suitable for accomplishing this purpose have been set forth above in the definition of R_a.

In the preferred embodiment of the invention R_b is free from substituents other than those inducing or increasing the solubility of the compound in water or aqueous alkaline solution; and R_c is a radical of the same type as R_b.

The diazoamino compounds of this invention, especially those which contain a plurality of the groups: oxy radicals, —OMe, carboxylic acid radicals, —COOMe, and/or sulfonic acid radicals, —$SO_3Me$, wherein Me represents hydrogen, sodium, or potassium, possess notable solubility in water or aqueous alkaline solutions and hence are especially valuable for use where instant solution is desirable. This property constitutes a marked advantage of the compounds of the present invention whether they are employed as dyestuffs, or insecticides, bactericides, etc.

The diazoamino compounds of the present invention may be prepared by coupling an aromatic diazonium salt of the general formula:

$$Ar-(N=N-z)_x \qquad (9)$$

(wherein Ar represents an aromatic radical as previously set forth; z represents an acid group, for example Cl; and x represents a positive integer indicating the number of diazo substituents on the aromatic residue, preferably 1, 2, or 3) with the stoichiometrical quantity of a primary or secondary amino-amid of the general formula below, which however should not be a coupling component:

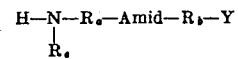

wherein R_a, R_b and R_c have the values previously ascribed.

The reaction to form the diazoamino compounds proceeds at low temperatures. The coupling of the diazonium salt with the amino-amid is advantageously effected by bringing together aqueous solutions of the individual reactants in the presence of an alkaline medium which serves to bind the acid liberated by the coupling. The diazoamino compound may be recovered by crystallization, including salting out, or by drying the solution containing it in vacuum or in other suitable manner, for instance, with the aid of an inert gas or on a rotary drum drier.

The compounds of my invention are especially applicable to the dyeing of textile fibers and may be used for this purpose in a manner similar to diazo or nitrosamine compositions. The diazoamino compounds of this invention are stable in the presence of coupling components and hence may be used for the preparation of stable dye compositions comprising one or more of the diazoamino compounds and a suitable coupling component or components.

Coupling of the diazoamino compounds of this invention with coupling components which are normally employed with the diazo compounds corresponding to the said diazoamino compounds may be effected by treatment with acid, as by introducing an acid into the bath containing a solution of the diazoamino compound and the coupling component, or by subjecting fibers containing a coupling component to the action of an acidified bath of the diazoamino compound or by subjecting fibers impregnated with a solution or paste of the diazoamino compound and a coupling component to the action of an acid bath or acid vapors.

The proportions of coupling component to diazoamino compound in the compositions of my invention may vary widely. Preferably, however, I mix the two constituents in about stoichiometrical quantities. The compositions may comprise the constituents in dry form or in solution. The dry composition may be prepared by mechanical admixture of the two constituents in solid phase or by evaporating a solution of the two constituents.

The compositions containing a diazoamino compound of the present invention and a coupling component, may be applied to textile fibers in the usual manner. They are particularly suitable for the dyeing of fabrics by the printing process.

A printing paste is prepared by mixing together about stoichiometrical quantities of a diazoamino compound of the type previously defined and a coupling component, adding to the mixture sodium hydroxide solution in quantity sufficient to dissolve the components, and making up the mixture to a printing paste in the usual manner by adding thereto a thickening agent such as starch and/or gum tragacanth and the necessary quantity of water. If desired, Turkey-red oil or other assistants, e. g. dispersing agents or solvents may be added. The fabric is printed with this printing paste in the usual manner; then either with or without drying and steaming, it is treated for a short time, say around twenty seconds, in a bath containing an acid, for example ½ per cent to 10 per cent of formic acid, acetic acid, or oxalic acid at a temperature between 50° and 95° C. The bath may also contain other assistants, penetrants, etc., for example around 5 per cent of Glauber's salt ($Na_2SO_4.10H_2O$), or sodium chloride (NaCl), or sodium acetate ($CH_3COONa$). Instead of developing the dye in an acid bath, it may be developed by passing it through an acid-vapor ager containing, for example, steam and vapors of acetic or formic acid or both. After development of the print in any of the above manners, it may be rinsed, washed, and dried in the customary manner.

The following examples of amines which may be diazotized and coupled to form diazoamino compounds within the purview of the present invention, illustrate the applicability of the invention to the aromatic diazo compounds in general—

3-chloraniline
4-chlor-2-amino-1-methylbenzene
4-chlor-2-amino-1-methoxybenzene
4-nitro-2-amino-1-methylbenzene
5-nitro-2-amino-1-methylbenzene
3-nitro-4-amino-1-methylbenzene
5-chlor-2-amino-1-methylbenzene
3-chlor-2-amino-1-methylbenzene
6-chlor-2-amino-1-methylbenzene
3-chlor-4-amino-1-methylbenzene
4,5-dichlor-2-amino-1-methylbenzene
2,5-dichlor-4-amino-1-methylbenzene
6-benzoylamino-4-chlor-3-amino-1-methoxybenzene
2,5-dichlor-1-aminobenzene
1-aminoanthraquinone
1-amino-4-benzoylaminoanthraquinone
2-amino-diphenyl-sulfone
2-amino-4-methoxy-5-phenylamino-1-chlorobenzene
4,6-dichloro-2-amino-1-methylbenzene
2,4-dimethylaniline
3-amino-4-methoxy-6-nitro-1-methylbenzene
3-amino-4-methoxy-6-benzoylamino-1-methylbenzene
3-benzoylamino-4,6-dimethoxyaniline
4,4'-diamino-3,3'-dimethoxy-azobenzene
2,6-dimethoxy-4-benzoylamino-aniline
2,5-dimethoxy-4-benzoylamino-aniline
2-methoxy-4-benzoylamino-5-ethoxy-aniline
4-nitro-4'-amino-2',5'-dimethoxy-azobenzene
3-nitro-4'-amino-2',5'-dimethoxy-azobenzene
4-methyl-4'-amino-2-methoxy-5-methyl-azobenzene
4-chloro-4'-amino-2',5'-diethoxy-azobenzene
3-amino-benzotrifluoride.

The following amino-amids illustrate the variety of compounds which may be obtained therewith when coupled into diazo compounds in order to produce the diazoamino or diazoamino derivatives of the present invention—

| | | |
|---|---|---|
| Methylamino-ethane-sulfonamido-acetic acid | $HN-C_2H_4-SO_2NH-CH_2-COOH$ <br> $\vert$ <br> $CH_3$ | (11) |
| Ethanolamino-ethane-sulfonamido-acetic acid | $HN-C_2H_4-SO_2NH-CH_2-COOH$ <br> $\vert$ <br> $CH_2CH_2-OH$ | (12) |
| Amino-ethane-sulfonamido-acetic acid | $HN-C_2H_4-SO_2NH-CH_2-COOH$ <br> $\vert$ <br> $H$ | (13) |
| Amino-ethane-sulfonamido-benzene-para-sulfonic acid | $HN-C_2H_4-SO_2NH-\langle\rangle-SO_3H$ <br> $\vert$ <br> $H$ | (14) |
| Ethanolamino-ethane-sulfonamido-benzene-para-sulfonic acid. | $HN-C_2H_4-SO_2NH-\langle\rangle-SO_3H$ <br> $\vert$ <br> $C_2H_4OH$ | (15) |
| Amino-ethyl-imido-sulfonyl-para-benzoic acid | $HN-C_2H_4-NHSO_2-\langle\rangle-COOH$ <br> $\vert$ <br> $H$ | (16) |
| Methylamino-ethyl-imido-sulfonyl-benzene-para-sulfonic acid. | $HN-C_2H_4-NHSO_2-\langle\rangle-SO_3H$ <br> $\vert$ <br> $CH_3$ | (17) |
| Amino-ethyl-imido-sulfonyl-ethane-sulfonic acid | $HN-C_2H_4-NHSO_2-C_2H_4-SO_3H$ <br> $\vert$ <br> $H$ | (18) |
| N-mono-succinyl-ethylene-diamine | $HN-C_2H_4-NHCO-C_2H_4-COOH$ <br> $\vert$ <br> $H$ | (19) |
| N-mono-succinyl-N'-methyl-ethylenediamine | $HN-C_2H_4-NHCO-C_2H_4-COOH$ <br> $\vert$ <br> $CH_3$ | (20) |
| N-mono-maleyl-N'-methyl-ethylene-diamine | $HN-C_2H_4-NHCO-CH=CH-COOH$ <br> $\vert$ <br> $CH_3$ | (21) |
| Methylamino-ethane-sulfonamido-ethane-sulfonic acid (methyl-tauryl-taurine). | $HN-C_2H_4-SO_2NH-C_2H_4-SO_3H$ <br> $\vert$ <br> $CH_3$ | (22) |

| Name | Structure | No. |
|---|---|---|
| N,N'-di-sarcosinyl-1,5-diamino-naphthalene-disulfonic acid | naphthalene with NHCO—CH$_2$—NH—CH$_3$ at position 1, HO$_3$S and SO$_3$H, HN—CH$_2$—CONH (CH$_3$) | (23) |
| N,N-di-glycol-1,4-diamino-benzene-disulfonic acid | benzene with NHCO—CH$_2$—NH$_2$, (SO$_3$H)$_2$, HN—CH$_2$—CONH (H) | (24) |
| Derived from triethylene-tetramine and benzene disulfonic acid | HN—C$_2$H$_4$—NHSO$_2$—C$_6$H$_4$—SO$_3$H<br>CH$_2$<br>CH$_2$<br>HN—C$_2$H$_4$—NHSO$_2$—C$_6$H$_4$—SO$_3$H | (25) |
| N,N'-di-(ethanol-glycyl)-1,5-diamino-naphthalene-disulfonic acid | naphthalene with NHCO—CH$_2$—NH—CH$_2$CH$_2$OH, HO$_3$S, SO$_3$H, NHCO—CH$_2$—NH—CH$_2$CH$_2$OH | (26) |
| Piperazine-sulfonyl-ethane-sulfonic acid | HN(CH$_2$—CH$_2$)$_2$N—O$_2$S—C$_2$H$_4$—SO$_3$H | (27) |
| Piperazine-sulfonyl-para-benzoic acid | HN(CH$_2$—CH$_2$)$_2$N—SO$_2$—C$_6$H$_4$—COOH | (28) |
| The condensation product of salicyl-sulfonyl-chloride + piperazine. | HN(CH$_2$—CH$_2$)$_2$NSO$_2$—C$_6$H$_3$(OH)—COOH | (29) |
| N,N'-dimethyl-iminoethyl-imido-sulfonyl-3-hydroxy-benzene-4-carboxylic acid. | HN(CH$_3$)—CH$_2$—CH$_2$—N(CH$_3$)SO$_2$—C$_6$H$_3$(OH)—COOH | (30) |
| N-mono-succinyl-ethylene-diamine-N'-methylene-sulfurous acid. | HN—C$_2$H$_4$—NHCO—C$_2$H$_4$—COOH<br>CH$_2$O—SO$_2$H | (31) |
| Methylamino-ethane-sulfonamido-benzene-para-sulfonic acid. | HN(CH$_3$)—C$_2$H$_4$—SO$_2$NH—C$_6$H$_4$—SO$_3$H | (32) |
| Di-(methylamino-ethane-sulfonyl)-taurine | CH$_3$—NH—C$_2$H$_4$—SO$_2$<br>CH$_3$—NH—C$_2$H$_4$—SO$_2$ \}N—C$_2$H$_4$—SO$_3$H | (33) |
| 1-methylimino-ethyl-imido-sulfonyl-benzene-4-sulfonamido-hexyl-sulfuric acid. | HN(CH$_3$)—C$_2$H$_4$—NHO$_2$S—C$_6$H$_4$—SO$_2$NH—CH(CH$_2$—CH$_2$)$_2$CH(O—SO$_3$H) | (34) |

| | | |
|---|---|---|
| p-phenylene-di-(glycyl sulfanilide) | 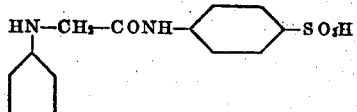 | (35) |
| Ethylene-di-(glycyl-sulfanilide) | 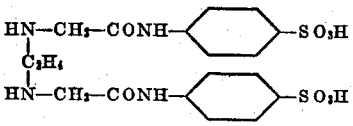 | (36) |
| Di(ethyl-glycyl-sulfanilide)ether | 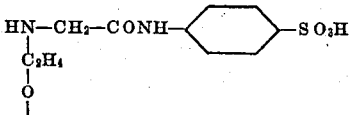 | (37) |
| Di-(ethyl-glycyl-glycine)ether | $O(C_2H_4-NH-CH_2-CONH-CH_2-COOH)_2$ | (38) |
| Ethylene-di(glycyl-taurine) | $C_2H_4(NH-CH_2-CONH-C_2H_4-SO_3H)_2$ | (39) |
| Ethylene-di(glycyl-glycine) | $C_2H_4(NH-CH_2-CONH-CH_2-COOH)_2$ | (40) |
| Ethylene-di(glycylimido-4-sulfo-6-benzoic acid) | 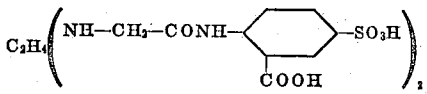 | (41) |
| Di-(para-sulfo-phenyl-glycyl-)ethylene-diamide |  | (42) |
| Di-(para-carboxy-phenyl-glycyl-)ethylene-diamide |  | (43) |
| Methylamino-ethyl-sulfonamido-ethanol | 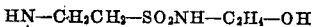 | (44) |
| Methylamino-ethyl-sulfonamido-2,3,4,5,6-pentahydroxy hexane | 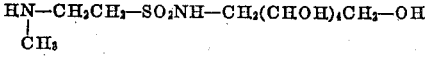 | (45) |
| 4-methylamino-ethyl-sulfonamido-cyclo-hexanol | 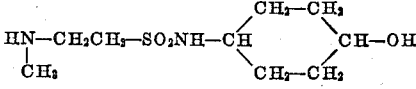 | (46) |
| 2,3,4,5,6-pentahydroxy-hexylimino-ethyl-sulfonamido-ethanol | 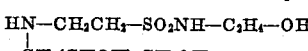 | (47) |
| Glycylamidoethanol<br>From: Ammonia ← chloracetyl-chloride → monoethanolamine | 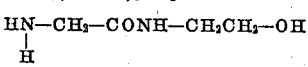 | (48) |
| Sarcosinylamido-ethanol<br>From: Methylamine ← chlor-acetyl-chloride → monoethanolamine |  | (49) |
| Ethylimino-acetimido-diethanol<br>From: Ethylamine ← chlor-acetyl-chloride → diethanolamine | 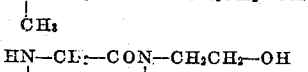 | (50) |
| Ethanolimino-acetimido-diethanol<br>From: Monoethanolamine ← chlor-acetyl-chloride → diethanolamine | 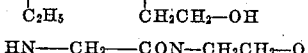 | (51) |
| Methylamino-succinyl-bis(diethanolimid)<br>From: 2-diethanolamine ← fumaryl-chloride → methylamine | 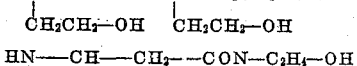 | (52) |
| 1-Sarcosinylamido-2,3,4,5,6-pentahydroxy-hexane<br>From: Methylamine ← chloracetyl-chloride → glucamine | 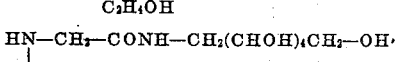 | (53) |
| 1,5-Bis[sarcosinyl(hydroxyethyl)imido]-naphthalene<br>From: 2-(methylamine)←2-(chlor-acetyl-chloride)→(1,5-di-ethanol-diamino-naphthalene). | 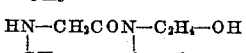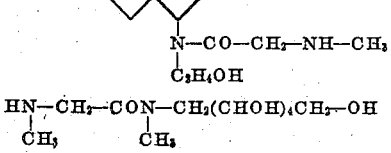 | (54) |
| Sarcosinyl(methyl)glucimid<br>From: Methylamine←chlor-acetyl-chloride→methyl-glucamine. | HN—CH₂—CON—CH₂(CHOH)₄CH₂—OH<br>│  │<br>CH₃ CH₃ | (55) |

| Name | Structure | No. |
|---|---|---|
| Methylamino-succinyl-diglucamid<br>From: Fumaryl-chloride←2-glucamine→methyl-amine. | HN—CH—CONH—CH$_2$(CHOH)$_4$CH$_2$—OH<br>\|   \|<br>CH$_3$ CH$_2$—CONH—CH$_2$(CHOH)$_4$CH$_2$—OH | (56) |
| Hydroxy-ethyl-glycyl-amino-malonic acid | HN—CH$_2$—CONH—CH—COOH<br>\|   \|<br>CH$_2$CH$_2$OH  COOH | (57) |
| Methyl-glycyl-amino-malonic acid | HN—CH$_2$—CONH—CH—COOH<br>\|   \|<br>CH$_3$  COOH | (58) |
| Sarcosinyl-glycine | HN—CH$_2$—CONH—CH$_2$—COOH<br>\|<br>CH$_3$ | (59) |
| Hydroxy-ethyl-glycyl-glycine | HN—CH$_2$—CONH—CH$_2$—COOH<br>\|<br>CH$_2$CH$_2$OH | (60) |
| Ethyl-glycyl-amino-4-chlor-benzene-3-sulfonic acid | HN—CH$_2$—CONH—C$_6$H$_3$(Cl)(SO$_3$H)<br>\|<br>C$_2$H$_5$ | (61) |
| Hydroxyethyl-glycyl-amino-4-chlor-benzene-3-sulfonic acid | HN—CH$_2$—CONH—C$_6$H$_3$(Cl)(SO$_3$H)<br>\|<br>CH$_2$CH$_2$OH | (62) |
| Methyl-glycyl-sulfanilic acid | HN—CH$_2$—CONH—C$_6$H$_4$—SO$_3$H<br>\|<br>CH$_3$ | (63) |
| Hydroxyethyl-glycyl-sulfanilic acid | HN—CH$_2$—CONH—C$_6$H$_4$—SO$_3$H<br>\|<br>CH$_2$CH$_2$OH | (64) |
| Hydroxyethyl-glycyl-2-amino-4-sulfo-benzoic acid | HN—CH$_2$—CONH—C$_6$H$_3$(COOH)(SO$_3$H)<br>\|<br>CH$_2$CH$_2$OH | (65) |
| Methyl-tauryl-2-amino-2-methyl-1,3-propanediol | HN—C$_2$H$_4$—SO$_2$—NH—C(CH$_2$OH)$_2$(CH$_3$)<br>\|<br>CH$_3$ | (66) |
| Sarcosinyl-N-ethyl-anthranilic acid | HN—CH$_2$—CON(C$_2$H$_5$)—C$_6$H$_4$—COOH<br>\|<br>CH$_3$ | (67) |
| Sarcosinyl-N-hydroxy-ethyl-anthranilic acid | HN—CH$_2$—CON(CH$_2$CH$_2$OH)—C$_6$H$_4$—COOH<br>\|<br>CH$_3$ | (68) |
| Hydroxyethyl-glycyl-amino-benzene-2,5-disulfonic acid | HN—CH$_2$—CONH—C$_6$H$_3$(SO$_3$H)$_2$<br>\|<br>CH$_2$CH$_2$OH | (69) |
| Methyl-glycyl-2-ethylamino-4-sulfonyl-benzoic acid | HN—CH$_2$—CON(C$_2$H$_5$)—C$_6$H$_3$(COOH)(SO$_3$H)<br>\|<br>CH$_3$ | (70) |
| Ethanol-glycyl-2-ethyl-amino-4-sulfonyl-benzoic acid | HN—CH$_2$—CON(C$_2$H$_5$)—C$_6$H$_3$(COOH)(SO$_3$H)<br>\|<br>CH$_2$CH$_2$OH | (71) |
| Ethanol-glycyl-2-hydroxy-ethylamino-4-sulfonyl-benzoic acid. | HN—CH$_2$—CON(CH$_2$CH$_2$OH)—C$_6$H$_3$(COOH)(SO$_3$H)<br>\|<br>CH$_2$CH$_2$OH | (72) |
| 3-sarcosinylamino-4-hydroxy-5-sulfonyl-benzoic acid | HN—CH$_2$—CONH—C$_6$H$_2$(OH)(SO$_3$H)(COOH)<br>\|<br>CH$_3$ | (73) |

| Name | Formula | No. |
|---|---|---|
| Leucyl-glycine | $HN-CH-CONH-CH_2-COOH$<br>$\quad\ \ \|\qquad\ \|$<br>$\quad\ H\quad CH_2CHCH_3$<br>$\qquad\qquad\ \ \|$<br>$\qquad\qquad CH_3$ | (74) |
| N-Methyl-leucyl-glycine | $HN-CH-CONH-CH_2-COOH$<br>$\quad\ \ \|$<br>$\quad\ CH_3\diagdown$<br>$\qquad\quad CH_2CHCH_3$<br>$\qquad\qquad\ \ \|$<br>$\qquad\qquad CH_3$ | (75) |
| Sarcosinyl-acetyl-glycine | $HN-CH_2-CON-CH_2-COOH$<br>$\quad\ \ \|\qquad\quad\ \|$<br>$\quad\ CH_3\quad CH_3-CO$ | (76) |
| Sarcosinyl-sulfanilic-N-ethyl-sulfuric acid | $HN-CH_2-CON-\langle\ \rangle-SO_3H$<br>$\quad\ \ \|\qquad\quad\ \|$<br>$\quad\ CH_3\quad CH_2CH_2OSO_3H$ | (77) |
| Sarcosinylamino-butyl-sulfuric acid | $HN-CH_2-CONH-C_4H_8-OSO_3H$<br>$\quad\ \ \|$<br>$\quad\ CH_3$ | (78) |
| Sarcosinylamino-butyl-phosphoric acid | $HN-CH_2-CONH-C_4H_8-OPO_3H_2$<br>$\quad\ \ \|$<br>$\quad\ CH_3$ | (79) |
| Sarcosinylamino-ethyl-sulfuric acid | $HN-CH_2-CONH-C_2H_4-OSO_3H$<br>$\quad\ \ \|$<br>$\quad\ CH_3$ | (80) |
| Sarcosinylamino-ethyl-phosphoric acid | $HN-CH_2-CONH-C_2H_4-OPO_3H_2$<br>$\quad\ \ \|$<br>$\quad\ CH_3$ | (81) |
| Sarcosinyl-(N-methyl)amino-ethyl-sulfonyl-benzene-4-sulfonic acid | $HN-CH_2-CON-C_2H_4-OSO_2-\langle\ \rangle-SO_3H$<br>$\quad\ \ \|\qquad\quad\ \|$<br>$\quad\ CH_3\quad CH_3$ | (82) |
| Sarcosinylamino-propyl-acid-maleate | $HN-CH_2-CONH-C_3H_6-O-CO-CH=CH-COOH$<br>$\quad\ \ \|$<br>$\quad\ CH_3$ | (83) |
| Ethylglycyl-amino-iso-hexyl-beta-sulfuric acid | $HN-CH_2-CONH-CH_2CH-OSO_3H$<br>$\quad\ \ \|\qquad\qquad\ \ \|$<br>$\quad\ C_2H_5\qquad CH_2CHCH_3$<br>$\qquad\qquad\qquad\quad\ \|$<br>$\qquad\qquad\qquad\quad CH_3$ | (84) |
| Sarcosinyl-piperidine-beta-methylsulfuric acid | $HN-CH_2-CON-CH_2-CH-CH_2-OSO_3H$<br>$\quad\ \ \|\qquad\quad\ \|\qquad\ \ \|\qquad\quad$<br>$\quad\ CH_3\quad CH_2\ CH_2$<br>$\qquad\qquad\quad\diagdown\ \diagup$<br>$\qquad\qquad\quad\ CH_2$ | (85) |
| Sarcosinyl-pyrrolidine-alpha-methyl-sulfuric acid | $HN-CH_2-CON---CH-CH_2-OSO_3H$<br>$\quad\ \ \|\qquad\quad\ \|\qquad\ \ \|$<br>$\quad\ CH_3\quad CH_2\ CH_2$<br>$\qquad\qquad\quad\diagdown\ \diagup$<br>$\qquad\qquad\quad\ CH_2$ | (86) |
| Sarcosinylpyrrolidine-alpha-methyl-phosphoric acid | $HN-CH_2-CON---CH-CH_2-OPO_3H_2$<br>$\quad\ \ \|\qquad\quad\ \|\qquad\ \ \|$<br>$\quad\ CH_3\quad CH_2\ CH_2$<br>$\qquad\qquad\quad\diagdown\ \diagup$<br>$\qquad\qquad\quad\ CH_2$ | (87) |
| Sarcosinyl-(N-methyl)-1,4-amino-phenoxy-ethyl-sulfuric acid | $HN-CH_2-CON-\langle\ \rangle-O-C_2H_4-OSO_3H$<br>$\quad\ \ \|\qquad\quad\ \|$<br>$\quad\ CH_3\quad CH_3$ | (88) |
| Sarcosinyl-(N-methyl)-amino-ethyl-phosphoric acid | $HN-CH_2-CON-C_2H_4-OPO_3H$<br>$\quad\ \ \|\qquad\quad\ \|$<br>$\quad\ CH_3\quad CH_3$ | (89) |
| Methylglycyl-piperidine-beta carboxylic acid | $HN-CH_2-CON-CH_2-CH-COOH$<br>$\quad\ \ \|\qquad\quad\ \|\qquad\ \ \|$<br>$\quad\ CH_3\quad CH_2CH_2\ CH_2$ | (90) |
| 1-Methylaminoethylamidosulfo-4-phenylsulfamido-cyclohexyl-sulfuric acid | $HN-C_2H_4-NHSO_2-\langle\ \rangle-SO_2NH-CH-CH-OSO_3H$<br>$\quad\ \ \|\qquad\qquad\qquad\qquad\qquad\ \ \ \|\quad\ \ \|$<br>$\quad\ CH_3\qquad\qquad\qquad\qquad\ \ \ CH_2\ CH_2$<br>$\qquad\qquad\qquad\qquad\qquad\qquad\quad\ CH_2-CH_2$ | (91) |
| 1-Methylaminoethyl-sulfonamido-2,3-propanediol | $HN-C_2H_4-SO_2NH-CH_2CHCH_2-OH$<br>$\quad\ \ \|\qquad\qquad\qquad\qquad\ \|$<br>$\quad\ CH_3\qquad\qquad\qquad\ \ OH$ | (92) |
| Ethylene-di-(glycyl-methyl-glucamine) | $C_2H_4\bigg[NH-CH_2-CO-N-CH_2-(CHOH)_4-CH_2OH\bigg]_2$<br>$\qquad\qquad\qquad\qquad\quad\ \|$<br>$\qquad\qquad\qquad\qquad\ CH_3$ | (93) |

The illustrative carboxyamido-and sulfonamido-amines have been set forth above in terms of the free acids. Normally it is advantageous to employ these products as salts. Hence, they may be employed in the forms wherein the hydrogens of the acid groups are substituted by metals, e. g. sodium or potassium.

Any of the coupling components in use for coupling with diazo compounds may be employed with the diazoamino compounds of the present invention, for instance, the naphthols and naphtholates, 2,3-hydroxynaphthoic acid, 2,3-hydroxynaphthoic acid arylides, 2,6-hydroxynaphthoic acid arylides, alkyl-phenyl-pyrazolones, aceto-acetic acid arylides, 2-hydroxy-carbazole-o-carbonic arylides, and the 2,4-dihydroxy-quinolines. Specific examples of these coupling components are given in connection with the following examples and in the table of dyestuff compositions which is a part hereof.

The following examples will serve to further illustrate the present invention (parts are by weight):

EXAMPLE 1

Part A 142 parts 1-methyl-4-chlor-2-aminobenzene are stirred with 250 parts aqueous hydrochloric acid of 19° Bé. (about 30% HCl) and ice is added to keep the temperature between 0° and 5° C. 69 parts sodium nitrite (100% NaNO₂) are dissolved in 200 parts water and this solution is added to the cooled amine hydrochloride. After diazotization is complete, the diazo solution is filtered and 210 parts of methylamino-ethane-sulfonamido acetic acid (Formula 11, M. W. 196) added, followed by an addition of sodium carbonate, while stirring, until the liquid reacts alkaline to Brilliant Yellow indicator paper. Coupling occurs gradually with progressive disappearance of the diazo body, and after two hours standing, a test made with a solution of R salt remains negative. Enough sodium chloride is then added to render the solution saturated, whereupon the light yellow diazoamino compound separates. It is filtered off, pressed, and dried, preferably in vacuum at 50° C.

The diazoamino compound has the following probable formula:

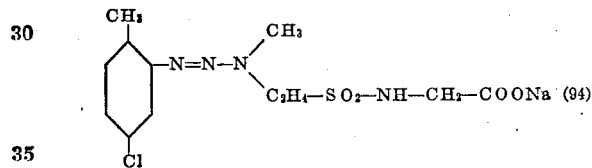

The methylamino-ethane sulfonamido acetic acid used in above example is conveniently prepared by reacting alpha-chlor, beta-ethane-sulfo-chloride with glycine, and reacting the resulting condensation product with mono-methylamine.

Part B

A dyestuff composition is made by mixing and grinding 366 parts of the dry diazoamino compound as obtained according to Part A above with 300 parts of the sodium salt of 2,3-hydroxynaphthoic acid-ortho-toluidide. A printing paste is then prepared by dissolving 60 parts of the dyestuff composition in 60 parts Cellosolve (mono-methyl-ether of ethyleneglycol) and 330 parts hot water. The solution is thickened with 550 parts of a starch tragacanth thickener. Cotton material is printed with the resulting paste by means of an engraved copper roll. The printed material is then dried and the insoluble azo dye is developed by passing the print through a hot aqueous solution (210° F.) of 5 per cent Glauber salt, 3 per cent acetic acid, and 2 per cent formic acid for between 20 and 30 seconds. The printed pattern is thus developed in a brilliant red dyeing of the red azo dye of the following probable constitution:

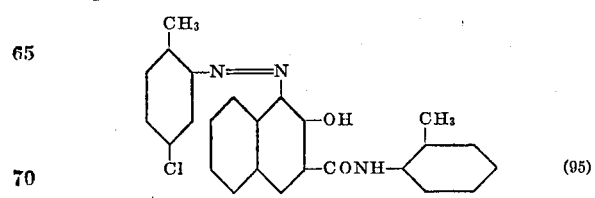

The fabric thereafter is rinsed, soaped, rinsed, and dried.

Part C

Instead of the ortho-toluidide of 2,3-hydroxynaphthoic acid used in Part B, equivalent parts (½ mol for each mol) of di-acetoacetyl-tolidide are used under otherwise similar conditions and yield a yellow print of the yellow dyestuff of the following probable constitution:

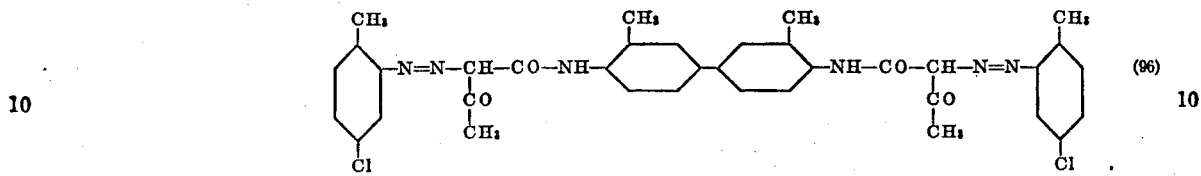

Example 2

Part A 127.5 parts of 3-chloro-1-aminobenzene are stirred with 250 parts aqueous hydrochloric acid 19° Bé. The crystal slurry is cooled to 0°–5° C. by the addition of ice, and diazotized with a solution of 69 parts sodium nitrite (100% NaNO₂) in 300 parts of cold water. When diazotization is completed, 300 parts of methylamino-ethane sulfonamido-benzene-4-sulfonic acid (Formula 32, M. W. 294) are added while agitating, followed by sufficient sodium carbonate solution to render the liquor slightly alkaline. Coupling occurs very readily, whereupon sodium chloride is added to precipitate the corresponding diazoamino compound.

The product is filtered off, washed with a saturated sodium chloride solution, pressed free of the brine solution and dried at 60° C., in vacuum.

It is lightly colored, readily soluble in water, very stable towards alkaline hydrolysis, but regenerates the 3-chloro-benzene-diazonium chloride upon acid hydrolysis. Its probable formula is the following:

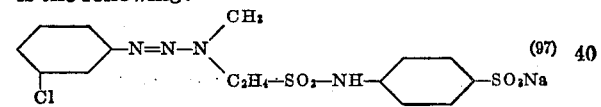

Part B

Equimolecular amounts of the above dry diazoamino compound and of the sodium salt of 2,3-hydroxynaphthoic acid anilide are intimately mixed and ground together. A dyestuff composition is thus obtained which is applied in a way similar to that described in Example 1. The use of the composition may be illustrated by the pad dyeing of regenerated cellulose, for which it is very suitable.

80 parts of above dry mixture are dissolved in 80 parts alcohol followed by the addition of 300 parts hot water. The solution is then diluted to 1000 parts total weight with water at 40° C., containing 1 per cent of a 6 per cent gum tragacanth solution. The rayon fabric composed of regenerated cellulose is passed through this solution, which is at a temperature of approximately 45° C., in a padding machine so regulated as to leave 100 per cent of the dye liquor on the padded material, based on the weight of the fabric. Thereafter the fabric is very rapidly dried over hot cans and directly passed through a continuous steamer supplied with saturated steam containing ¼ per cent of its weight acetic acid and 1/10 per cent of its weight formic acid. The steaming device is conveniently arranged by letting the acid drip from various points of the steamer onto a steam heated acid-proof plate, whereby instantaneous vaporization and mixing with the main steam supply takes place.

Thus, a very brilliant plain shade of orange is obtained possessing excellent fastness properties, due to formation of the orange dyestuff of the probable formula:

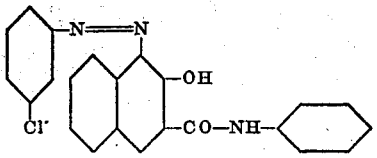

EXAMPLE 3

Part A 167 parts of 2,5-dichloro-1-aminobenzene are stirred with 500 parts aqueous hydrochloric acid 14° Bé. (approximately 20 per cent HCl) and after formation of the amine-hydrochloride, the crystal slurry is cooled to 5° C., with ice, and diazotized with the addition of 69 parts sodium nitrite (100 per cent) in 250 parts water. After diazotization is complete, the solution is filtered, whereupon 300 parts of methylamino-ethane-sulfoamido-benzene-sulfonic acid (Formula 32, M. W. 294) are added while stirring, followed by a slow and careful addition of 20% caustic soda solution until the reaction mixture is faintly alkaline to Brilliant Yellow indicator paper. At this stage the solution is agitated for some time while its temperature is maintained at about plus 5° C. After a few hours, the diazo reaction ceases to be positive (testing with R Salt indicator paper), due to the formation of the diazoamino compound of the following probable constitution:

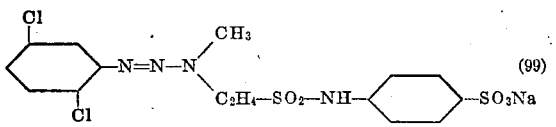

Part B

A solution of 330 parts of the sodium salt 2,3-hydroxynaphthoic acid-ortho-phenetidide in 1000 parts diethylene glycol and 500 parts water are added to the mixture obtained in Part A, and the whole solution is left standing overnight. It is then filtered from possible precipitated inorganic salts and standardized so as to represent 5000 parts total of the dye intermediate solution. 100 to 400 parts of this solution are thickened directly with 900 to 600 parts of a neutral starch tragacanth paste to give 1000 parts of printing paste of proper consistency and this is applied in the usual manner to a cotton fabric by means of a printing roll. The printed fabric is dried and subjected to the action of live steam containing acetic acid vapor, which causes the diazoamino compound to hydrolyze readily into the active coupling 2,5-dichlorobenzene-diazonium salt and causes formation on the fiber of a very brilliant scarlet azo dyestuff of the following probable constitution:

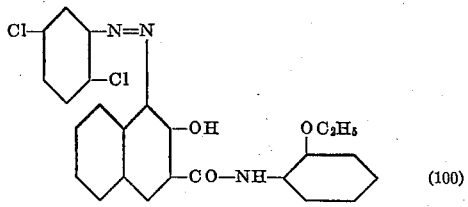

the printed material is aftertreated according to usual methods.

In a similar manner diazoamino compounds may be prepared from the other chlor- and nitro-substituted anilines previously mentioned and methylamino-ethane-sulfonamidobenzene-sulfonic acid (Formula 32) or the alkali salt thereof. The products thus formed are yellowish to deeply orange-yellow powders, readily soluble in water. They are stable towards alkalis, but are decomposed into the corresponding diazonium salts and methylamino-ethane-sulfonamidobenzene-sulfonic acid by the action of acid reagents thereon.

EXAMPLE 4

415 parts of the bis-diazoamino compound obtained from two molecular equivalents of 2-nitro-4-methyl-phenyl-diazonium chloride and about one molecular equivalent of N-N'-di-sarcosinyl-1,5-diamino-naphthalene-disodium-disulfonate (Formula 23) having the probable formula:

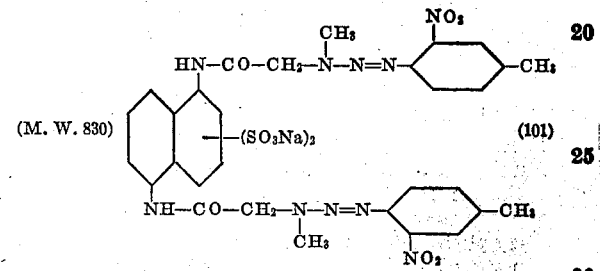

are dissolved in an aqueous solution comprising 2500 parts of water and about 100 parts of sodium acetate. To the resultant solution an aqueous alkaline solution comprising about 180 parts of aceto-acetanilide (100 per cent), 2000 parts of water, and 45 parts of NaOH is added. To this solution acetic acid is gradually added to accomplish neutralization, whereupon coupling proceeds progressively as more acetic acid is added. The rate of coupling may be accelerated by raising the temperature for instance to between 50° and 60° C. Upon completion of the reacton a yellow dyestuff of the probable formula:

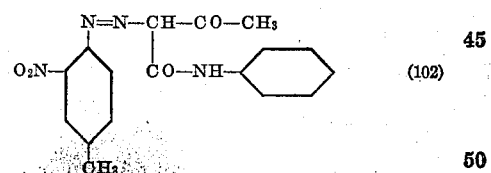

separates. This product may be filtered off, washed, and dried in any suitable manner.

The coupling reaction may be accomplished on textile fibers when proceeding with the mixed solutions of the diazoamino compound and the coupling component according to the method illustrated in Example 2.

EXAMPLE 5

An aqueous solution of the bis-diazoamino compound formed by coupling 2-nitro-4-methoxy-phenyl-diazonium-chloride and ethylene-di-(glycyl-glycine) of the formula:

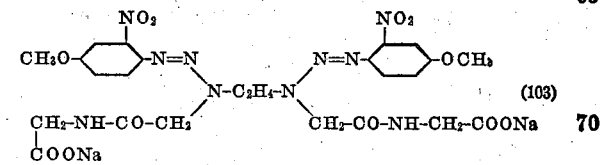

is treated with an alkaline aqueous aceto-acetic acid toluidide solution containing equimolecular quantities of the aceto-acetic toluidide, in the manner set forth in Example 4. An orange-yellow azo dye of the probable formula:

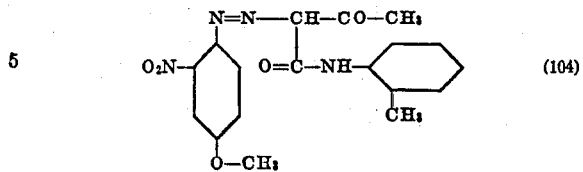

is thus obtained.

EXAMPLE 6

To 1000 parts by weight of an aqueous solution containing 5 parts by weight of the diazoamino compound obtained from 2-methyl-5-chlor-phenyl-diazonium chloride and piperazine-sulfonyl-sodium-ethane-sulfonate (Formula #27), and having the probable formula:

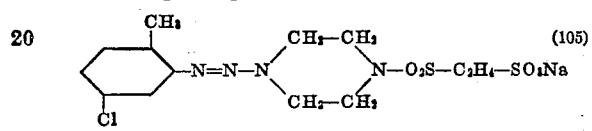

there are added 20 parts acetic acid, 5 parts of alum, and 5 parts of sodium acetate.

Cotton fabric is impregnated in the customary manner with 2-hydroxy-3-naphthoic acid-2'-naphthylamide; for instance 50 grams of cotton may be impregnated with a liquor containing ½ to 5 grams of the amide, about 1 to about 10 ccs. of 34° Bé. (28%) NaOH and about 1 to about 10 ccs. of Turkey-red oil of 50 per cent strength.

The impregnated cotton is introduced into the bath containing the acidified diazoamino compound and the bath is slowly heated to about 50° to 60° C. The formation of the azo dyestuff on the fiber occurs very readily. It has the probable formula:

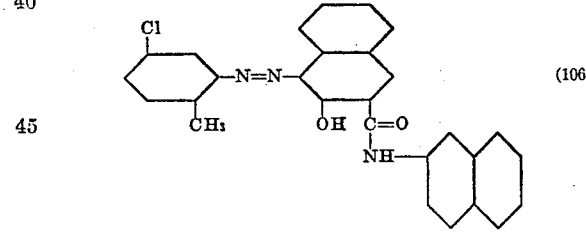

When the diazo compound can no longer be detected in the bath, the cotton is removed therefrom, is rinsed, soaped at boiling temperature, rinsed again, and dried. A brilliant red of excellent fastness is thus obtained.

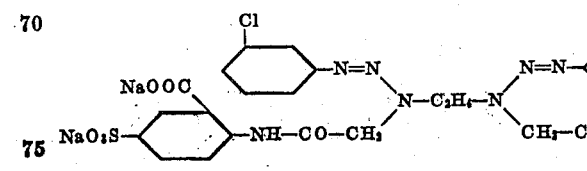

EXAMPLE 7

About 47 parts of the bis-diazoamino compound from 3-chlor-phenyl-diazonium chloride and ethylene-di-(glycyl-imido-4-sodium-sulfonyl-6-sodium benzoate) (Formula #41)

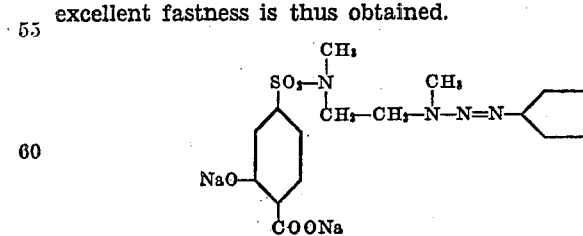

and about 28 parts of 2-hydroxy-3-naphthoic acid-2'-toluidide were made up to a paste with hot water with the addition of 60 parts of the mono-ethyl-ether of glycol. To this paste 30 parts of 36° Bé. (30 per cent) NaOH, 600 parts of neutral starch-tragacanth thickener were added, and the product made up to 1000 parts with water. This printing paste was applied to cotton fabric in the usual manner. The print was then steamed for around five minutes (or as an alternative, hung in contact with the atmosphere for about twenty-one hours). The cotton was then introduced for a short time into an aqueous bath, maintained at about 80° C. to 95° C., and containing 50 grams acetic acid and 50 grams sodium sulfate per liter. By this treatment, the azo dye of the probable formula:

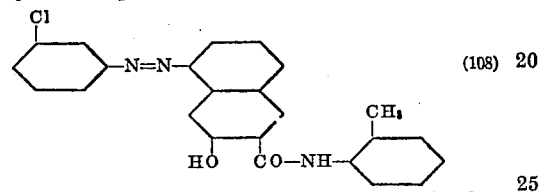

is developed on the fiber yielding a print of a very brilliant orange shade of excellent fastness A similar result is obtained by developing the print in an acid bath containing formic or oxalic acid, or another strong organic acid instead of the acetic acid mixture.

Likewise, developments in a vapor ager containing a volatile acid, such as acetic acid, produce similar results.

EXAMPLE 8

Part A 199 parts 4,4'-diamino-diphenylamine are diazotized in the usual manner with 580 parts hydrochloric acid 20° Bé. (about 31% HCl), and 140 parts sodium nitrite in a total of 1500 parts of water, the solution being kept at a temperature of 0° to 10° C., and 580 parts of N,N'-dimethyl-ethylene-diamino-sulfonyl-3-hydroxybenzene-4-carboxylic acid (M. W. 288) are slowly added thereto while stirring.

The reaction liquor is then rendered slightly alkaline with sodium carbonate. After a while the solution loses its capacity to couple (as detectable by a negative test with alkaline R Salt solution). Upon adding sodium chloride to the solution, a precipitate forms. The precipitate is filtered off, and dried in vacuum. The dried product has a pale brown color, is highly soluble in water, and has the following probable formula:

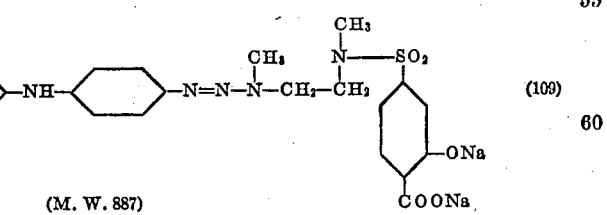

(M. W. 887)

Part B

About 90 parts of the above bis-diazoamino compound and 55 parts of 2-hydroxy-3-naphthoic acid anilide were made up to a paste with 175 parts by weight of water and the addition of 100 parts of the monoethyl-ether of glycol. To this paste, 50 parts of 36° Bé. (30 per cent NaOH) and 500 parts of neutral starch tragacanth thickener were added, and the product made up to 1000 parts with water. This printing paste was applied to the cotton fiber in the usual manner. Upon developing in the acid vapor ager, a very deep black print was obtained of the azo dye having the following constitution:

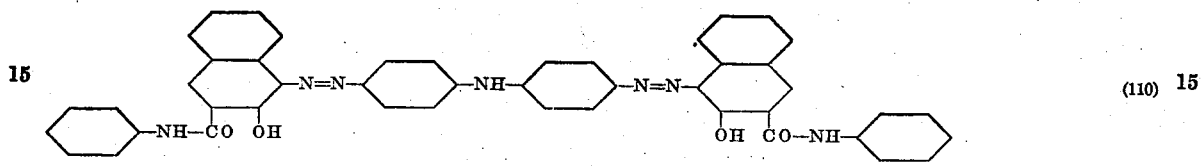
(110)

Thereafter the print was rinsed, soaped at boil, rinsed, and finished in the usual way.

EXAMPLE 9

To a mixture of 65 parts mono-ethanolamine, 500 parts of water and 80 parts of sodium hydroxide, there are slowly added 163 parts of chloroethane ·sulfonyl-chloride. During this addition the temperature is kept below 35° C. and the mixture is vigorously agitated. After about two hours the odor of acid chloride is all gone. 100 parts of an aqueous 33 per cent solution of methylamine is now added and the solution heated under reflux on a steam bath for four hours. At the end of this time 53 parts of soda ash are added and the mixture distilled until no more methyl amine comes off. To this solution containing the stabilizer,

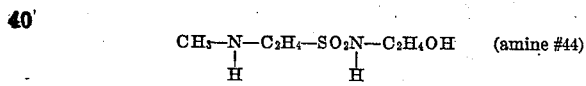 (amine #44)

is added a solution of toluene-2-diazonium chloride corresponding to 110 parts of the original amine. Soda ash is added gradually during the coupling in sufficient quantities to keep the solution at all times alkaline to Brilliant Yellow paper. After coupling is complete the diazoamino is precipitated from solution by the addition of salt. The solution is chilled to 0° C. and the product filtered off. The diazoamino is a low melting yellow-colored solid, soluble in water as the sodium salt.

EXAMPLE 10

Following the procedure of Example 9, only substituting for 65 parts of monoethanolamine 180 parts of glucamine, we obtain the stabilizer:

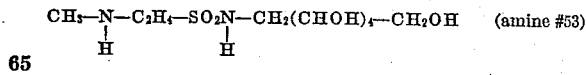 (amine #53)

EXAMPLE 11

Sarcosinyl monoethanolamine

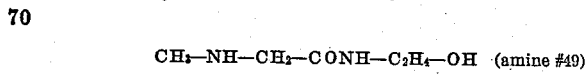 (amine #49)

can conveniently be prepared in the following manner: 61 gms. of monoethanolamine (M. W. 61) are treated in 60 gms. of water with 113 gms. of chlor-acetyl-chloride (M. W. 113). The temperature is kept at 0°–5° C. by means of external cooling and soda ash solution is slowly added to bind the hydrochloric acid formed in the reaction. Methylamine in the form of an aqueous solution is then added to the above reaction in considerable excess to molecular equivalent required and the whole mass is then heated gradually to gentle reflux and kept at reflux temperature for four hours. At the end of this time the excess methylamine is removed by distillation in vacuo, the sarcosinyl monoethanolamine remaining behind in the solution. It is not isolated from this solution for coupling with diazotized amines.

EXAMPLE 12

Sarcosinyl glucamide,
$CH_3—NH—CH_2—CONH—CH_2—$
$(CHOH)_4—CH_2OH$ (amine #53)

is prepared in a similar manner by substituting the molecular equivalent of glucamine,

for the monoethanolamine in the above method of preparation.

EXAMPLE 13

To prepare methyl-amino-succinyl-bis(diethanolimid) (amine #52), a solution is made of 10.5 parts of diethanolamine and 10 parts of sodium carbonate in 40 parts of cold water. To this is added 7 parts of fumaryl chloride keeping the temperature below 30° C. during the reaction by the addition of ice. When the odor of fumaryl chloride is no longer perceptible, the solution is treated with 50 parts of 31% aqueous methylamine solution and refluxed for four hours. At the end of this time the excess methylamine is removed by distillation in vacuo. The residual solution containing the methyl-amino-succinyl-bis(diethanolimid) is used as such for coupling with diazotized amines.

Diazoimino compound of the secondary amines of Examples 11, 12 and 13 may be prepared by the same procedure employed in Example 1.

It will be obvious from the above examples that the procedure involved in the preparation and use of my new diazo-amino compounds or compositions is capable of almost limitless variations. Any of the usual methods of developing azo dyestuffs by coupling diazoamino compounds and coupling components may be employed with the diazoamino compounds of the present invention.

The following table further illustrates the nature of compositions of dyes that may be obtained by the application of my invention. In this table are shown the shades of dyeings obtainable with the diazoamino compounds and the coupling components set forth. It will be understood that such dyeings may be obtained by substantive preparation, or by printing textile fibers with a printing paste containing the diazoamino compound and coupling component and subsequently developing, or by impregnating the textile fiber with one of the components and subsequently developing the dye by bringing the impregnated fiber into contact with the other component under conditions favoring azo coupling.

| No. | Base | No. | Stabilizer | Coupling Component | Shade |
|---|---|---|---|---|---|
| 1 | 2,5-dichloro-1-aminobenzene | 20 | N-mono-succinyl-N'-methyl-ethylenediamine. | Diacetoacetyl-o-tolidide | Yellow. |
| 2 | ----do---- | 21 | N-mono-maleyl-N'-methyl-ethylene-diamine. | 2,5-dichloro-4-nitro-1-aceto-acetyl-amino-benzene. | Do. |
| 3 | 4-chloro-2-amino-1-methyl-benzene | 11 | Methylamino-ethane-sulfoamido-acetic acid. | Diacetoacetyl-o-tolidide | Do. |
| 4 | 4,5-dichloro-2-amino-methylbenzene. | 12 | Ethanolamino-ethane-sulfonamido-acetic acid. | ----do---- | Do. |
| 5 | 4-chloro-2-amino-1-methoxybenzene. | 17 | Methylamino-ethyl-imido-sulfonyl-benzene para-sulfonic acid. | ----do---- | Do. |
| 6 | 2,5-dichloro-1-methyl-4-aminobenzene. | 32 | Methylamino-ethane-sulfonamido-benzene-para-sulfonic acid. | ----do---- | Do. |
| 7 | 5-nitro-2-amino-1-methylbenzene | 32 | ----do---- | Sodium compound of 4-nitro-2,5-dimethoxy-1-aceto-acetyl-amino-benzene. | Do. |
| 8 | 3-chloro-1-aminobenzene | 45 | Methylamino-ethylsulfonamido-2,3,4,5,6-pentahydroxy hexane. | 2-hydroxy-naphthalene-3-carboxylic acid-o-toluidide. | Orange. |
| 9 | ----do---- | 32 | Methylamino-ethane-sulfonamido-benzene-para-sulfonic acid. | Sodium compound of 2 hydroxy-naphthalene-3-carboxylic acid-o-toluidide. | Do. |
| 10 | 2,5-dichloro-1-aminobenzene | 23 | N,N'-di-sarcosinyl-1,5-diamino-naphthalene-disulfonic acid. | 2-hydroxynaphthalene-3-carboxylic acid o-phenetidide. | Do. |
| 11 | 4-chloro-2-amino-1-methylbenzene | 40 | Ethylene-di(glycyl-glycine) | ----do---- | Scarlet. |
| 12 | 2-amino-4-methoxy-5-benzoylamino-1-chlorobenzene. | 40 | ----do---- | 2-hydroxynaphthalene-3-carboxylic acid o-toluidide. | Violet. |
| 13 | 2,5-dichloro-4-amino-1-methyl-benzene. | 40 | ----do---- | Sodium compound of 2-hydroxy-naphthalene-3-carboxylic acid o-anisidide. | Scarlet. |
| 14 | 3-chloro-1-aminobenzene | 93 | Ethylene-di(glycyl-methyl glucamine). | 2-hydroxynaphthalene-3-carboxylic acid o-anisidide. | Red. |
| 15 | 4,6-dichloro-2-amino-1-methylbenzene. | 20 | N-mono-succinyl-N'-methyl-ethylenediamine. | 2-hydroxynaphthalene-3-carboxylic acid p-anisidide. | Do. |
| 16 | ----do---- | 15 | Ethanolamino-ethane-sulfon-amido-benzene-para-sulfonic acid. | Sodium compound of 2-hydroxy-naphthalene-3-carboxylic acid o-anisidide. | Do. |
| 17 | 4-chloro-2-amino-1-methylbenzene | 31 | N-mono-succinyl-ethylene-diamine-N'-methylene-sulfurous acid. | ----do---- | Do. |
| 18 | 4-chloro-2-amino-1-methoxybenzene. | 20 | N-mono-succinyl-N'-methyl-ethylenediamine. | ----do---- | Do. |
| 19 | 4-chloro-2-amino-1-methylbenzene | 53 | 1-Sarcosinylamido-2,3,4,5,6-pentahydroxyhexane. | 2-hydroxynaphthalene-3-carboxylic acid o-toluidide. | Do. |
| 20 | ----do---- | 23 | N,N'-di-sarcosinyl-1,5-diamino-naphthalene-di-sulfonic acid. | Sodium compound of 2-hydroxy-naphthalene-3-carboxylic acidanilide. | Do. |
| 21 | 4-amino-1,3-dimethylbenzene | 40 | Ethylene-di(glycyl-glycine) | 2-hydroxynaphthalene-3-carboxylic acid-2'-methyl-4'-methoxy-anilide. | Turkey red. |
| 22 | 4-nitro-2-amino-1-methoxybenzene | 32 | Methylamino-ethane-sulfonamido-benzene-para-sulfonic acid. | Sodium compound of 2-hydroxy-naphthalene-3-carboxylic acid-meta-nitranilide. | Bluish red. |
| 23 | 4,5-dichloro-2-amino-1-methylbenzene. | 22 | Methylamino-ethane-sulfon-amido-ethane-sulfonic acid (methyl-tauryl-taurine). | ----do---- | Turkey red. |
| 24 | 5-nitro-2-amino-1-methylbenzene | 15 | Ethanolamino-ethane-sulfonamido-benzene para-sulfonic acid. | Sodium compound of 2-hydroxy-naphthalene-3-carboxylic acid ortho-toluidide. | Bordeaux. |
| 25 | ----do---- | 22 | Methylamino-ethane-sulfonamido-ethane sulfonic acid (methyl-tauryl-taurine). | 2-hydroxynaphthalene-3-carboxylic acid-ortho-toluidide. | Do. |
| 26 | 3-amino-4-methoxy-6-nitro-1 methylbenzene. | 53 | 1-Sarcosinyl-amido-2,3,4,5,6-pentahydroxy hexane. | 2-hydroxynaphthalene-3-carboxylic acid alpha-naphthylamide. | Do. |
| 27 | ----do---- | 29 | The condensation product of salicyl-sulfonyl-chloride+piperazine. | 2-hydroxynaphthalene-3-carboxylic acid beta-naphthyl-amide. | Do. |
| 28 | ----do---- | 31 | N-mono-succinyl-ethylene-diamine-N'-methylene-sulfurous acid. | 2-hydroxynaphthalene-3-carboxylic acid-2',5'-dimethoxy anilide. | Do. |
| 29 | 3-amino-4-methoxy-6-benzoylamino-1-methyl-benzene. | 20 | N-mono-succinyl-N'-methyl-ethylenediamine. | Sodium compound of 2-hydroxy-naphthalene-3-carboxylic acid ortho-toluidide. | Violet. |
| 30 | ----do---- | 40 | Ethylene-di(glycyl-glycine) | 2-hydroxynaphthalene-3-carboxylic acid ortho-toluidide. | Do. |
| 31 | 6-amino-4-benzoylamino-1,3-dimethoxy-benzene. | 55 | Sarcosinyl(methyl)-glucimid | Sodium compound of 2-hydroxy-naphthalene-3-carboxylic acid anilide. | Do. |
| 32 | ----do---- | 20 | N-mono-succinyl-N'-methyl-ethylenediamine. | 2-hydroxynaphthalene-3-carboxylic acid ortho-toluidide. | Do. |
| 33 | ----do---- | 21 | N-mono-maleyl-N'-methyl-ethylenediamine. | Sodium compound of 2-hydroxy-naphthalene-3-carboxylic acid-5'-chloro-2'-toluidide. | Do. |
| 34 | 6-amino-3-benzoylamino-1,4-diethoxybenzene. | 11 | Methylamino-ethane-sulfonamido-acetic acid. | Sodium compound of 2-hydroxy-naphthalene-3-carboxylic acid ortho-toluidide. | Blue. |
| 35 | ----do---- | 55 | Sarcosinyl(methyl)glucimid | 2-hydroxynaphthalene-3-carboxylic acid anilide. | Do. |
| 36 | 6-amino-3-benzoylamino-4-ethoxy-1-methoxybenzene. | 22 | Methylamino-ethane-sulfonamido-ethane-sulfonic acid (methyl-tauryl-taurine). | Sodium compound of 2-hydroxy-naphthalene-3-carboxylic acid ortho-toluidide. | Do. |
| 37 | ----do---- | 23 | N,N'-di-sarcosinyl-1,5-diamino-naphthalene-disulfonic acid. | Sodium compound of 2-hydroxy-naphthalene-3-carboxylic acid anilide. | Do. |
| 38 | 6-amino-3-benzoylamino-1,4-dimethoxy-benzene. | 24 | N,N'-di-glycyl-1,4-diamino-benzene-disulfonic acid. | Sodium compound of 2-hydroxy-naphthalene-3-carboxylic acid-ortho-toluidide. | Do. |
| 39 | ----do---- | 26 | N,N'-di-(ethanol-glycyl)-1,5-diamino-naphthalene-disulfonic acid. | ----do---- | Do. |
| 40 | 4-chlor-2-amino 1-methylbenzene | 55 | Sarcosinyl(methyl)glucimid | Sodium compound of 2-hydroxy-carbazole ortho-carboxylic acid-2'-toluidide. | Brown. |
| 41 | 4-nitro-4'-amino-2',5'-dimethoxy-azobenzene. | 40 | Ethylene-di(glycyl-glycine) | Sodium compound of 2-hydroxy-naphthalene-3-carboxylic acid ortho-toluidide. | Black. |
| 42 | 3-nitro-4'-amino-2',5'-dimethoxy-azobenzene. | 32 | Methylamino-ethane-sulfon-amido-benzene-para-sulfonic acid. | Sodium compound of 2-hydroxy-naphthalene-3-carboxylic acid alpha naphthyl-amide. | Do. |

This application is in part a continuation of my application Serial No. 740,179, filed August 16, 1934, and entitled Diazoamino compounds and their manufacture.

I claim:

1. As a new compound a diazoamino-amid of the following general formula,

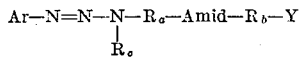

wherein Ar represents an aromatic radical free from solubilizing groups not separated from the aromatic nucleus by a diazoamino group; Amid represents —$SO_2NR$— or —CONR—; R represents hydrogen or an organic radical; $R_a$ represents an aliphatic radical; $R_b$ represents an aliphatic, alicyclic, or aromatic radical; $R_c$ represents hydrogen or an organic radical; and Y represents at least one solubilizing group.

2. A compound of the preceding claim wherein the diazoamino radical and the Amid radical of the formula are joined to the same or adjacent carbon atoms of $R_a$.

3. The method of producing a diazoamino-amid of the type set forth in claim 1, which comprises coupling in an alkaline medium an aromatic diazoamino salt of the general formula,

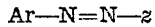

wherein Ar represents an aromatic radical free from solubilizing groups and z represents an acid group, with an amino-amid of the general formula,

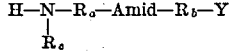

wherein Amid represents —$SO_2NR$— or —CONR—; R represents hydrogen or an organic radical; $R_a$ represents an aliphatic radical; $R_b$ represents an aliphatic, alicyclic, or aromatic radical; $R_c$ represents hydrogen or an organic radical; and Y represents at least one solubilizing group.

4. The method of producing a diazoamino-amid of the type set forth in claim 2, which comprises coupling in an alkaline medium an aromatic diazoamino salt of the general formula,

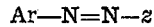

wherein Ar represents an aromatic radical free from solubilizing groups and z represents an acid group, with an amino-amid of the general formula

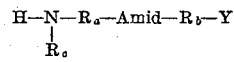

wherein Amid represents —$SO_2NR$— or —CONR—; R represents hydrogen or an organic radical; $R_a$ represents an aliphatic radical; $R_b$ represents an aliphatic, alicyclic, or aromatic radical; $R_c$ represents hydrogen or an organic radical; Y represents at least one solubilizing group; and the amino radical and the Amid radical of the formula are joined to the same or adjacent carbon atoms of $R_a$.

JEAN G. KERN.